Jan. 30, 1962 R. W. ADAMS ET AL 3,018,513
CLAMP FOR MATRICES FOR MOLDING PHONOGRAPH RECORDS
Filed Oct. 4, 1960

ROBERT W. ADAMS
ALLAN R. ELLSWORTH
INVENTORS.

BY Flam and Flam
ATTORNEYS.

United States Patent Office 3,018,513
Patented Jan. 30, 1962

3,018,513
CLAMP FOR MATRICES FOR MOLDING
PHONOGRAPH RECORDS
Robert W. Adams, Reseda, Calif. (1062 N. Orange Grove Ave., Los Angeles, Calif.), and Allan R. Ellsworth, 1011 N. Fuller Ave., Los Angeles, Calif.
Filed Oct. 4, 1960, Ser. No. 60,425
4 Claims. (Cl. 18—5.3)

Phonograph records of the disc type are now in common use. Such records are made by a molding process in which a blank made from plastic material is compressed between a pair of matrices (often called "stampers"). Under heat and pressure, the stampers reproduce the intricate detail of the modulated sound grooves upon the blank. Upon cooling, the plastic disc is removed from the mold; it is then capable of reproducing the original sound when played upon a suitable sound reproducer.

The mold assembly consists of two similar units comprising the stampers, back-up plates (hereinafter called "dies") which are capable of being heated and cooled by external means, and suitable devices for clamping the stampers to the dies. Each stamper is a relatively thin metal disc of an appropriate diameter to mold a particular size of phonograph record. The periphery of the stamper is clamped to the die by means of an annular ring (or a series of segments) with a suitable lip for bearing against the stamper at its outer edge and is attached to the die with screws or other means of tightening the clamping ring against the die surface.

The central area of the stamper must also be held against the die surface and restrained against lateral shift. This is commonly achieved by means of a bolt threaded into the die, or pased through a hole in the center of the die.

In the most commonly used method, the central hole in the stamper is circular and is concentric with the center of generation of the spiral grooves which contain the sound modulations. An assembly, consisting of a threaded center plate and a center cup, fits into a central circular recess in the die, and a peripheral lip on the center cup holds the stamper against the die face. In alternate methods, the cup may be omitted and an integral lip on the center plate itself bears against the stamper, holding it against the die. In either case, the lip extends radially outwardly over the inner edge of the stamper.

Another method has matching bevels on both the die and the center plate, with the inner margin of the stamper being clamped between the two bevels.

These commonly used methods have serious deficiencies in their functions which too often result in production of defective phonograph records for the following reasons:

Since the thickness of the stamper may vary, a variable space results at the bottom of the circular recess in the die under the center plate. This space must be filled by annular shims or laminations in order to maintain a flat central area on the record, and to resist the compressive forces during molding which tend to bend or deflect the center plate if the gap is not completely filled. Great care and accuracy are required to fill this gap with the laminations sufficiently to support the center plate and yet maintain enough pressure on the inner margin of the stamper to hold it against the die, a circumstance almost impossible to achieve in every setup.

The radially extending lip serves to hold the stamper against the die face in a vertical direction with a force depending upon the bending moment on the fragile lip (.010 inch–.015 inch thick), and the tensile stress on the vertical wall of the center cup. Ordinarily, this force is not sufficient to restrain the stamper against lateral movement due to the friction of the plastic material flowing across the surfaces of the stampers, coupled with the varying rates of radial thermal expansion and contraction of the several members of the mold assembly during the molding operation. This lack of restraint permits the stamper to shift relative to the center hole in the finished record and results in rejection of the record because of its "off-center" condition.

Since close temperature controls must be maintained during the molding operation, a further difficulty results from the type of assembly in which a central cup is used, with laminations beneath the cup. First, the heat conduction across the several gaps in such a laminated construction is reduced by each gap, giving less total heat transfer from the die to the plastic material of the record through the center plate assembly than through the stamper alone outside of the central area. This uneven heat distribution causes defective records because of "soft-centers" or warpage. The additional problem of the varying gap which must be filled with shims or laminations causes even further variations in heat transmission and further complicates the molding operation.

The radially extending lip which clamps the stamper must impress itself in the molded record, producing an annular indentation in the central part of the record. This indentation is unsightly and is often the cause for rejected records because of torn labels in this region. Further, since the thickness of the record is reduced by twice the thickness of the lip, a zone of weakness results which limits the minimum dimension of the record in this central area.

Where the lip is formed integrally with the center plate eliminating the cup, this integral lip is of necessity quite fragile in order to minimize the effect of thinning the record at the center. This fragility requires even greater care and accuracy in shimming under the center plate and results in expensive replacement costs for center plates since they are frequently damaged in operation.

Where matching bevels of the center plate and die recess are used for clamping, such an expedient eliminates the problems with the thin lips in the other two described devices, but retains the problem of the variable gap under the center plate. In addition, the greater conical bearing area of the plate against the stamper exaggerates the problem of point-to-point variation in thickness of the stamper and results in unequal clamping forces which permit undue shifting of the stampers during molding.

Other means for securing stampers in their central area are in use, but all are variations of the methods described above and have the same deficiencies.

It is one of the objects of this invention to make it possible to clamp the inner edge of the stamper in an improved manner, overcoming the objections discussed above.

In order to accomplish these results, the invention contemplates the use of a center plate received in a recess in a die, which clamps the inner edge of the stamper without any overlapping lips; and the center plate in clamping position is in good heat-exchange relationship to the die.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings.

Figure 1:
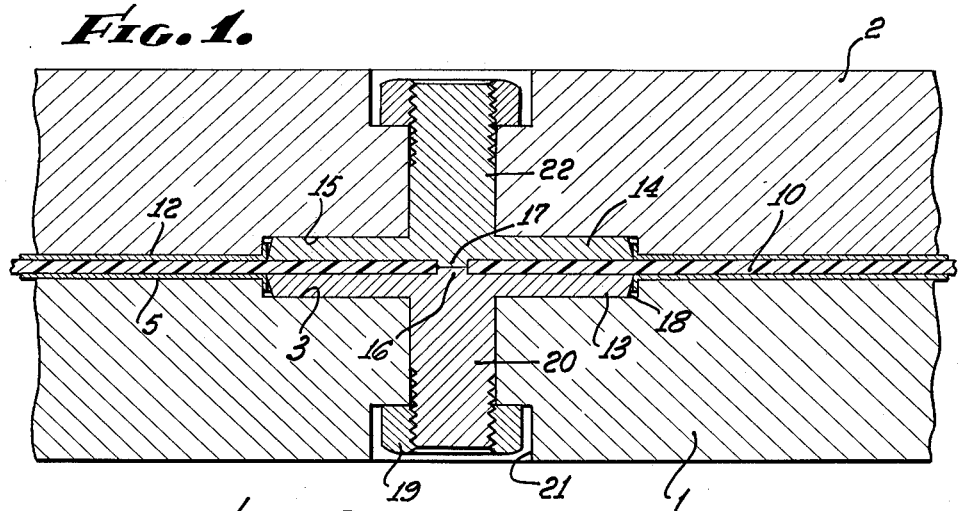
FIGURE 1 is a fragmentary sectional view of a device incorporating the invention.
Figure 2:
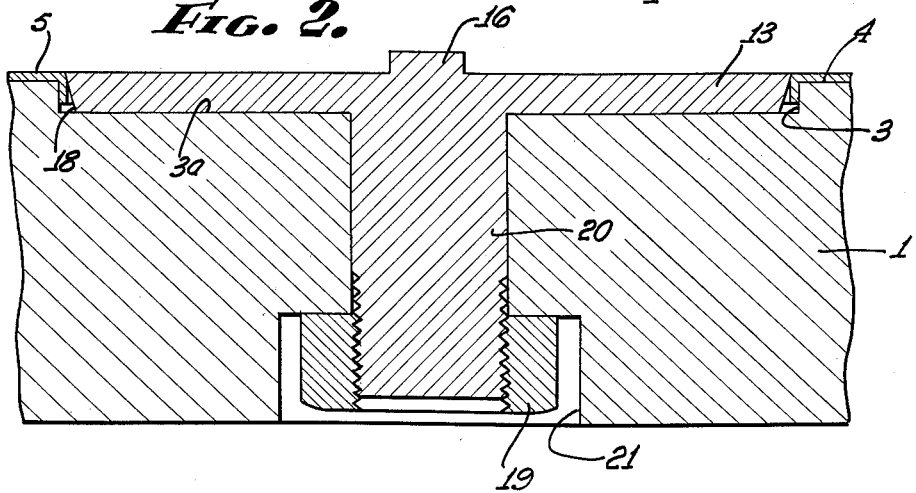
FIG. 2 is an enlarged sectional view similar to FIG. 1, but only of the lower portion of the device.

Die members 1 and 2 are shown as made of metal and are arranged to cooperate with each other to define a space in which a plastic molding operation can take place. Each of these die members may be provided, as is usual, with heating and cooling means, all as now well understood in the process of stamping records.

Die member 1 has a central recess 3 of cylindrical form. Its bottom 3a forms a circular area depressed below the upper surface 4 of the die member 1. A stamper 5 is arranged to be clamped to the top of the die 1 in a manner to be hereinafter described. This stamper 5 has a depending tubular portion or flange 6 extending within the recess 3 and having its exterior wall closely adjacent the wall of the recess 3.

Figure 4:
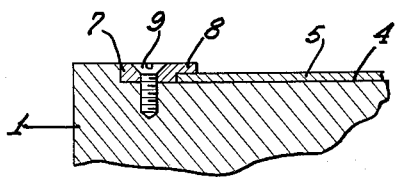
FIG. 4 is a fragmentary sectional view showing the structure for clamping the outer edge of a stamper.

The stamper 5 extends substantially to the outer edge of die member 1. It is concentric with the recess 3. The outer edge of the stamper 5 may be appropriately clamped to the die member 1, as for example by a ring 7 (FIG. 4) having a lip 8 overlying the edge of the stamper 5 and attached, as by a number of screws 9, to the die member 1. Of course, other conventional means for clamping the outer edge of the stamper 5 may be utilized.

The stamper 5 on its upper surface carries the spiral groove modulated in accordance with the sound to be recorded, and to be impressed upon a record disc 10 (FIG. 1) concentric with the stamper 5. This disc 10 overlies the stamper 5 and may be formed by the stamping operation between a stamper 12 opposed to the stamper 5 to form a double-sided record. The disc 10 is disposed between the dies 1 and 2 as a blank record; or else powdered or granular plastic material may be placed between the stampers 5 and 12 to produce the molded finished record.

The central portion of the record disc is formed by a cooperating set of center plates 13 and 14. These center plates are disposed in the recesses 3 and 15 respectively in the lower and upper die members 1 and 2. Each of the center plates 13 and 14 is provided with cooperating integral projections 16 and 17 forming or defining the central aperture of the record disc 10. Other means for forming the central aperture may be used, as shown for example in an application filed concurrently herewith on October 4, 1960, under Serial No. 60,440, in the names of Robert W. Adams and Allan R. Ellsworth. These projections 16 and 17 come into contact with each other when the two die members 1 and 2 are held or clamped together during the molding operation.

Figure 3:
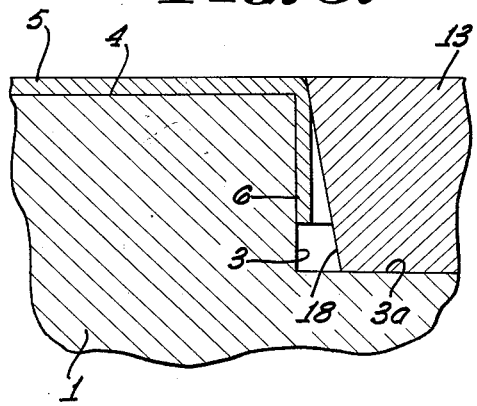
FIG. 3 is a still further enlarged fragmentary sectional view showing the clamping arrangements.

The outer edge of each of the center plate members 13 and 14 is tapered, as indicated by reference character 18 (FIG. 3). This taper is such that the upper edge of the center plate 13 firmly clamps the stamper 5 against the wall of the recess 3. At the same time, the lower surface of the center plate 13 is held fixedly in place against the plane bottom surface 3a of the recess 3. A stud 20 is integrally formed with the center plate 13 and extends into a bottom recess 21; a nut 19 threaded on the stud clamps the plate 13 tightly in place.

Since the two die members 1 and 2 are substantially identical in form, the center plate 14 and its integral stud 22 need not be further described. It, too, is provided with a tapered surface similar to tapered surface 18.

The taper of the surface 18 and the outer diameter of the center plate 13 are so designed as to provide a compressive action against the stamper 5 and hold it firmly in place against the wall of recess 3. FIG. 3 shows the upper edge of flange 6 slightly compressed by the surface 18.

The cylindrical flange or tubular extension 6 is turned down at right angles to the upper surface containing the sound grooves. The flange is accurately formed to fit into the circular center recess 3.

In actual practice, the thickness of stamper 5 may vary somewhat, but the cylindrical portion 6 is formed by drawing into a metal forming guide to produce a uniform and constant wall thickness irrespective of the working thickness of the disc portion of the stamper 5. Accordingly, a standard outside diameter and wedge angle on the center plate 13 clamp all stampers which have been formed to these constant dimensions without regard to the actual thickness of the stamper 5 before forming; and all of the stampers will fit a standard inside diameter of the central circular recess 3.

The wedging action of the tapered surface 18 results from the outside diameter of the center plate being slightly larger than the inside diameter of the cylindrical flange 6. When the center plate 13 is pulled down by the aid of nut 19, this interference causes the stamper 5 to be compressed between the center plate 13 and the inner wall 2, thus holding the stamper firmly against any movement in any direction.

Since the center plate 13 is always in contact with the bottom 3a of the die recess 3 regardless of the thickness of the stamper 5, the gaps and the necessity for shims or laminations are eliminated. Since the center plate 13 is supported by the die 1, there can be no deflection of the center plate. Furthermore, the interfering wedge action produced by the sloping surface 18 holds the stamper securely against lateral shifting.

Since the center plate is always in direct contact with the die 1 over a substantially large area, uniform conditions of heat transmission in each successive setup are obtained. There is substantial support against deflection of the center plate, permitting the use of materials for the center plate to obtain greater heat conductivity; for example, aluminum or brass can be used because of the greater strength obtained by the support of the center plate over a wide area.

As shown in FIG. 3, the top surface of the center plate 13 is almost flush with the surface of the stamper, eliminating the problems caused by the lip of the center plate in prior devices.

The wedging action of the center plate 13 provides a tight seal for the recess 3 when the center plate 13 is in place. This prevents influx of foreign material into the space between the stamper 5 and the face of the die 1. Such an arrangement prevents the forming of defective records due to minor projections on the stampers, and corresponding pits or small depressions on the record surfaces.

The inventors claim:

1. In a molding device for stamping disc records: a die; said die having a central cylindrical recess; a center plate having a depth corresponding substantially to the depth of the recess; said center plate having a tapered edge for clamping the inner edge of a stamper against the wall of said recess; and means for tightening the center plate against the bottom of said recess to urge the tapered surface toward said wall.

2. In a molding device for stamping disc records: a die; said die having a central cylindrical recess; a center plate having a depth corresponding substantially to the depth of the recess; said center plate having a tapered edge for clamping the inner edge of a stamper against the wall of said recess; a stud joined to the center plate and extending through the center of the die; and means for tightening the center plate against the bottom of said recess to urge the tapered surface toward said wall.

3. In a molding device for stamping disc records: a die having a central cylindrical recess; a stamper overlying the die and having a tubular central portion or flange received in said recess; a center plate having a depth substantially corresponding to the depth of the recess; said center plate having a tapered edge for clamping the tubular portion of the stamper against the wall of the recess; and means for tightening said center plate against the bottom surface of the die and thereby to urge the tapered edge into clamping contact with the interior surface of the tubular portion.

4. In a molding device for stamping disc records: a die having a central cylindrical recess and a flat bottom surface; a stamper overlying the die having a tubular central portion or flange received in said recess, the exterior surface of said flange fitting the interior cylindrical surface of the recess; a center plate having a depth corresponding to the depth of the recess so that when the plate engages said bottom surface, the exposed surface of the plate is substantially on the same plane as the exposed surface of the stamper; said center plate having a tapered edge for clamping only the upper portion of the flange against the wall of the recess; and means for tightening said center plate against the bottom surface of the die and for tightening said tapered edge into clamping contact with said upper portion of the interior surface of the flange.

References Cited in the file of this patent
UNITED STATES PATENTS

| | | |
|---|---|---|
| 1,358,577 | Roberts | Nov. 9, 1920 |
| 1,399,817 | Steventon | Dec. 13, 1921 |
| 1,447,183 | Roberts | Mar. 6, 1923 |
| 2,501,823 | Leedom | Mar. 28, 1950 |